Nov. 2, 1943.  O. W. BONNAFE  2,333,147
LUBRICATING APPARATUS FOR BROACHING MACHINES
Filed June 8, 1942  2 Sheets-Sheet 1
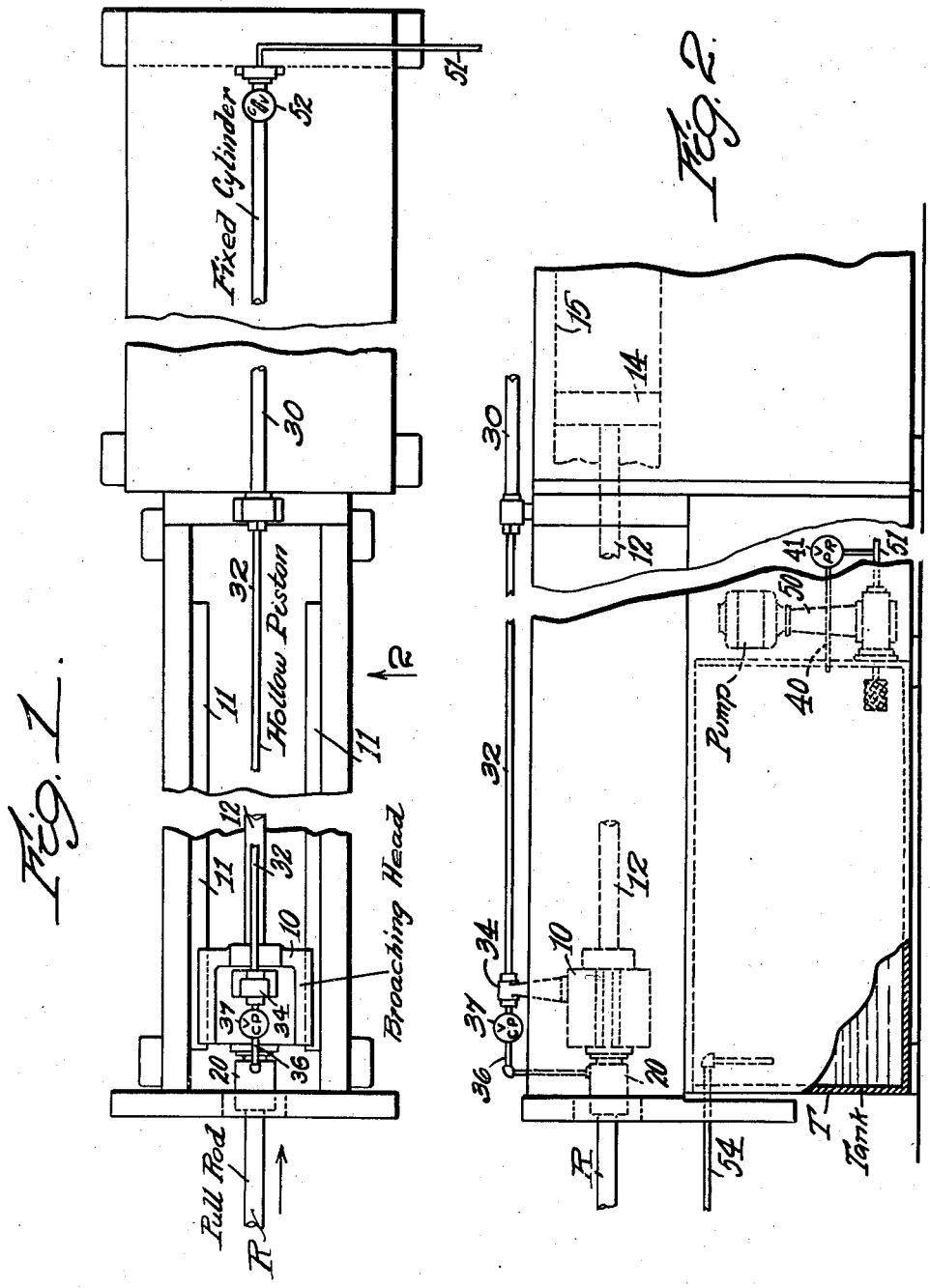
Inventor
Oliver W. Bonnafe Nov. 2, 1943.  O. W. BONNAFE  2,333,147
LUBRICATING APPARATUS FOR BROACHING MACHINES
Filed June 8, 1942  2 Sheets-Sheet 2
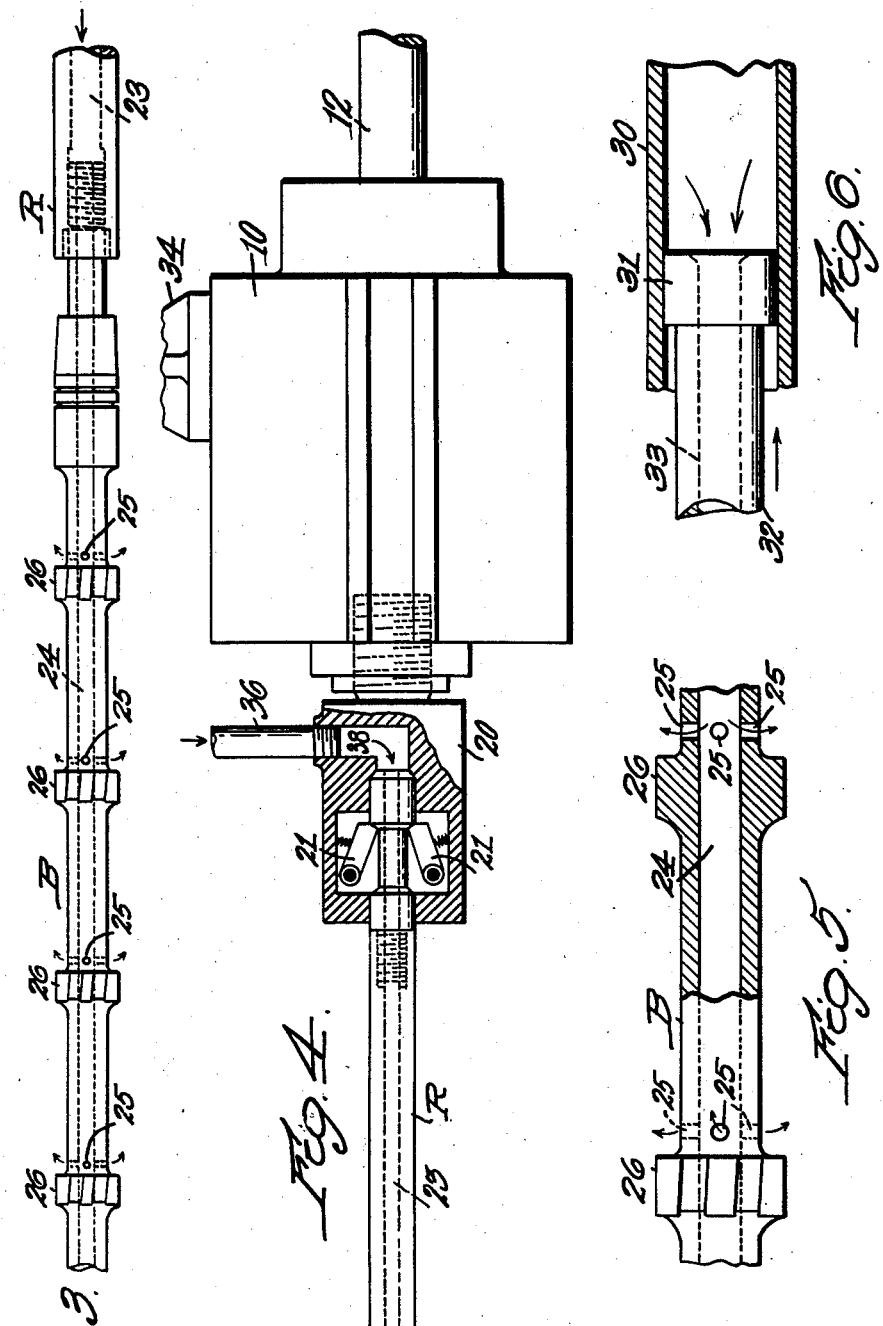

Patented Nov. 2, 1943

2,333,147

UNITED STATES PATENT OFFICE 2,333,147

LUBRICATING APPARATUS FOR BROACHING MACHINES

Oliver W. Bonnafe, Hudson, Mass., assignor to The La Pointe Machine Tool Company, Hudson, Mass., a corporation of Maine Application June 8, 1942, Serial No. 446,213

7 Claims. (Cl. 90—33)

This invention relates to apparatus for supplying cutting lubricant under pressure to a broaching machine having a reciprocated broaching head. While capable of general application, the invention is herein shown as embodied in a hydraulically-operated, pull-type broaching machine having an extended broaching stroke.

In such machines, it is necessary to supply lubricant under substantial pressure to the broach and work at the broaching point and during the broaching operation, but no lubricant is required during the return stroke of the broaching head or when the broaching head is at rest.

It is the general object of my invention to provide improved and simplified means for thus supplying lubricant under pressure, when and as needed but not otherwise.

In the preferred form, this general object is attained by providing an auxiliary lubricant cylinder and a piston telescoping therein during the broaching stroke and thereby discharging oil under pressure from said auxiliary cylinder to the broach and work at the broaching point. I also preferably provide low-pressure means for returning the oil to the auxiliary cylinder.

My invention further relates to arrangements and combinations of parts which will be hereinafter described and more particularly pointed out in the appended claims.

A preferred form of the invention is shown in the drawings, in which

Fig. 1 is a partial plan view of a horizontal hydraulic broaching machine embodying my improvements;

Fig. 2 is a partial side elevation, looking in the direction of the arrow 2 in Fig. 1;

Fig. 3 is a partial side elevation of a hollow pull rod and hollow broach through which the lubricant may be discharged at the broaching point;

Fig. 4 is a side elevation, partly in section, of the broaching head and broach holder;

Fig. 5 is an enlarged side elevation, partly in section, of a portion of a hollow broach; and Fig. 6 is an enlarged sectional elevation of parts of the lubricant cylinder and its telescoping piston and piston rod.

Referring to Figs. 1 and 2, I have shown parts of a horizontal hydraulic broaching machine of the pull type and comprising a broaching head 10 slidable between guideways 11 and connected by a piston rod 12 to a main piston 14 in a main cylinder 15. Oil under pressure is supplied to one end or the other of the cylinder 15 to reciprocate the piston 14 and the broaching head 10 in the usual manner, these parts in themselves forming no part of my present invention.

A broach holder 20 is connected to the broaching head 10 as shown in Fig. 4, and a pull rod R, when inserted in the holder 20, is engaged and locked by the usual dogs 21. The usual provision (not shown) is made for withdrawing the dogs to release the pull rod for removal from the broach holder 20 before a return stroke or before insertion of the pull rod in a new work piece.

A broach B is secured in the opposite end of the pull rod R as shown in Fig. 3, and both the pull rod R and broach B are made hollow or tubular, with passages 23 and 24 respectively through which lubricant may flow to side outlets 25 (Fig. 5) adjacent the cutting teeth 26. The passage 24 through the broach B is stopped off at the outer end of the broach to prevent useless escape of oil therefrom.

My present invention relates particularly to the improved apparatus which I have provided for supplying cutting lubricant under pressure to the hollow pull rod R and hollow broach B and for delivering the lubricant through the outlets 25 at points adjacent the cutting teeth 26. For this purpose I mount a small auxiliary lubricant cylinder 30 above the main broaching cylinder 15, and I provide a piston 31 and piston rod 32 (Fig. 6) telescoping in said cylinder 30 as the broaching head 10 moves to the right in Figs. 1 and 2 to perform a broaching stroke.

The outer end of the piston rod 32 is secured in a bracket 34 mounted on the broaching head 10 and movable horizontally therewith. The piston 31 and piston rod 32 are hollow or tubular, with an axial passage 33 (Fig. 6) connected at its outer end through a pipe 36 and a constant pressure valve 37 to a recess 38 (Fig. 4) in the broach holder 20. This recess communicates directly with the axial passage 23 in the pull rod R and with the axial passage 24 in the broach B. Any usual packing may be provided for the pull rod R in the holder 20.

A tank T (Fig. 2) in the lower part of the broaching machine casing is connected through a low pressure pump 50 and pipe 51 to the right-hand or rear end of the lubricant cylinder 30, which cylinder is provided with a check valve 52 adjacent the point of connection of the pipe 51 to the cylinder.

The lubricant discharged at the cutting point returns to the tank T through a pipe 54 (Fig. 2). Any usual by-pass connection 40 and pressure relief valve 41 (Fig. 2) may be provided to return the discharge of the pump 50 to the tank T when the cylinder 30 is full. The relief valve 41 will be set to open at a lower pressure than the constant pressure valve 37 in the pipe connection 36.

Having described the details of the construction of my improved lubricating apparatus, the operation thereof is as follows:

At the beginning of the broaching stroke the parts are in the position shown in Figs. 1 and 2. As the broaching head 10 is moved to the right to draw the pull rod R and broach B through the work, the piston rod 32 and piston 31 will be correspondingly moved to the right by their connection through the bracket 34 to the broaching head 10. The check valve 52 being closed, such telescoping movement forces the oil in the lubricant cylinder 30 out through the piston 31, piston rod 32, pipe connection 36, constant pressure valve 37, and recess 38 to the hollow pull rod R and hollow broach B. As much additional pressure will be developed as is necessary to eject the oil through the outlets 25.

Such delivery of oil will continue during the working stroke of the main piston 14 and broaching head 10; but will cease immediately when such movement is discontinued. Thereafter on the return stroke to the left, the piston rod 32 and piston 31 will be withdrawn in the cylinder 30, and the pump 50 will refill the cylinder through the pipe 51 and check valve 52.

I have thus provided very simple means for supplying lubricant to the broach and work at the broaching point and under any required pressure, while the pump 50 may operate at very low pressure and merely keeps the cylinder 30 supplied with oil.

Having thus described my invention and the advantages thereof, I do not wish to be limited to the details herein disclosed, otherwise than as set forth in the claims, but what I claim is:

1. Lubricating apparatus for a broaching machine having a reciprocated broaching head and a hollow broach comprising an auxiliary lubricating cylinder, a tubular piston and tubular piston rod telescoping in said cylinder, and a connection from the outer end of said tubular piston rod to said hollow broach through which oil under pressure may be delivered from said auxiliary cylinder through said tubular piston and through said connection to said hollow broach within the work and at the broaching point as the broaching head draws the broach through the work.

2. Lubricating apparatus for a broaching machine having a reciprocated broaching head comprising an auxiliary lubricating cylinder, a tubular piston and tubular piston rod telescoping in said cylinder, a connection from the outer end of said tubular piston rod through which oil under pressure may be delivered from said auxiliary cylinder to the broach and work at the broaching point as the broaching head draws the broach through the work, and means to refill said auxiliary cylinder with oil during the outward return movement of said broaching head and auxiliary piston.

3. The combination in lubricating apparatus as set forth in claim 2, in which means is provided to prevent escape of oil from said auxiliary cylinder except through said tubular piston and tubular piston rod during the broaching stroke.

4. The combination in lubricating apparatus as set forth in claim 2, in which means is provided to prevent escape of oil from said auxiliary cylinder except through said tubular piston and tubular piston rod during the broaching stroke and at not less than a predetermined minimum pressure.

5. Lubricating apparatus for a broaching machine having a reciprocated broaching head comprising an auxiliary lubricating cylinder, a piston and piston rod telescoping in said cylinder, one of said telescoping parts being relatively fixed and the other being relatively movable, means to telescope the movable part during a broaching operation, means to deliver the oil ejected from said cylinder to the broach and work at the broaching point, low pressure means to supply oil to said auxiliary cylinder, and a constant pressure valve in said oil delivery means set at a higher pressure than said supply means.

6. Lubricating apparatus for a broaching machine having a main cylinder and piston, a reciprocated broaching head and a hollow broach comprising an auxiliary lubricating cylinder mounted on said main cylinder, a piston and piston rod movable with the broaching head and telescoping in said cylinder and having an oil passage therethrough, and means to deliver the oil ejected from said cylinder through said oil passage and through the broach to the work at the broaching point but only during the working stroke of the broach.

7. Lubricating apparatus for a broaching machine having a main cylinder and piston, a reciprocated broaching head and a hollow broach comprising an auxiliary lubricating cylinder mounted on said main cylinder, a piston and piston rod telescoping in said cylinder and having a passage therethrough, a driving connection from said broaching head to said auxiliary piston rod, a connection from the outer end of said piston rod through which a lubricant under pressure may be delivered through the broach to the work at the broaching point as the broaching head draws the broach through the work, and back pressure means to determine a minimum pressure for said lubricant.

OLIVER W. BONNAFE.